E. F. WHARTENBY.
VEHICLE BODY INCLOSURE.
APPLICATION FILED JAN. 23, 1915.
1,163,727.
Patented Dec. 14, 1915.
3 SHEETS—SHEET 1.
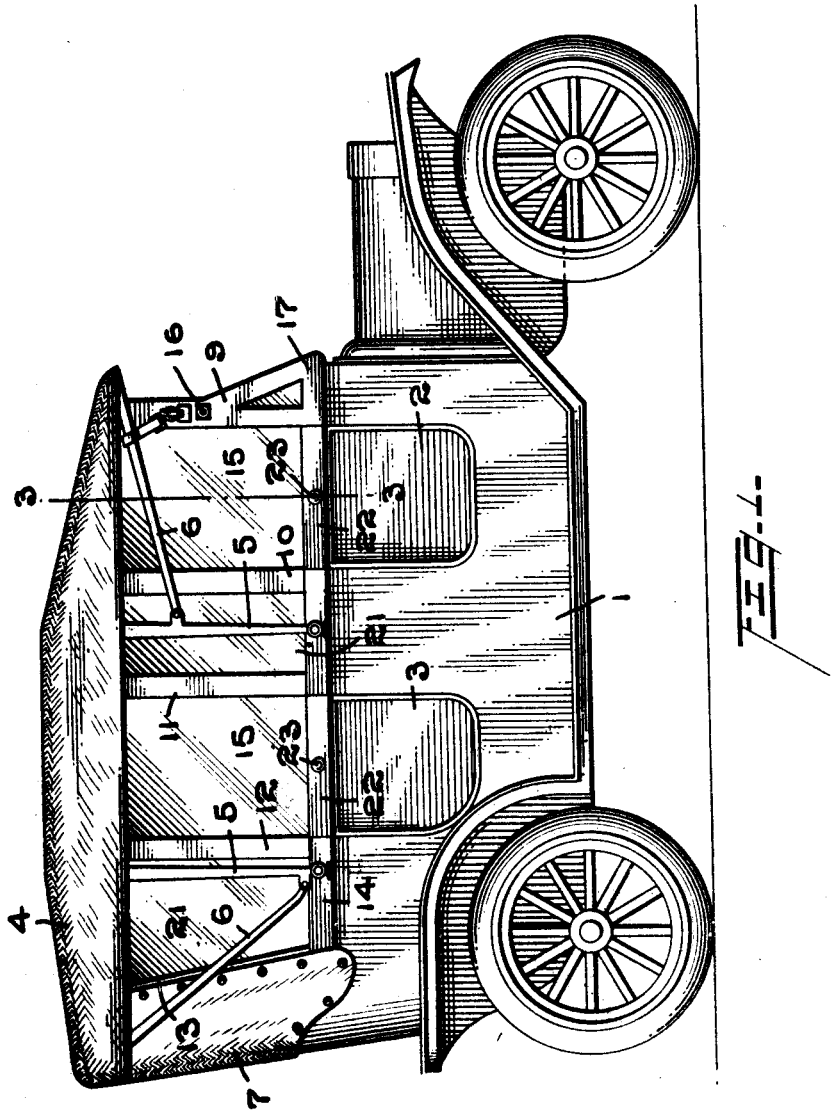

E. F. WHARTENBY.
VEHICLE BODY INCLOSURE.
APPLICATION FILED JAN. 23, 1915.
1,163,727.
Patented Dec. 14, 1915.
3 SHEETS—SHEET 2.
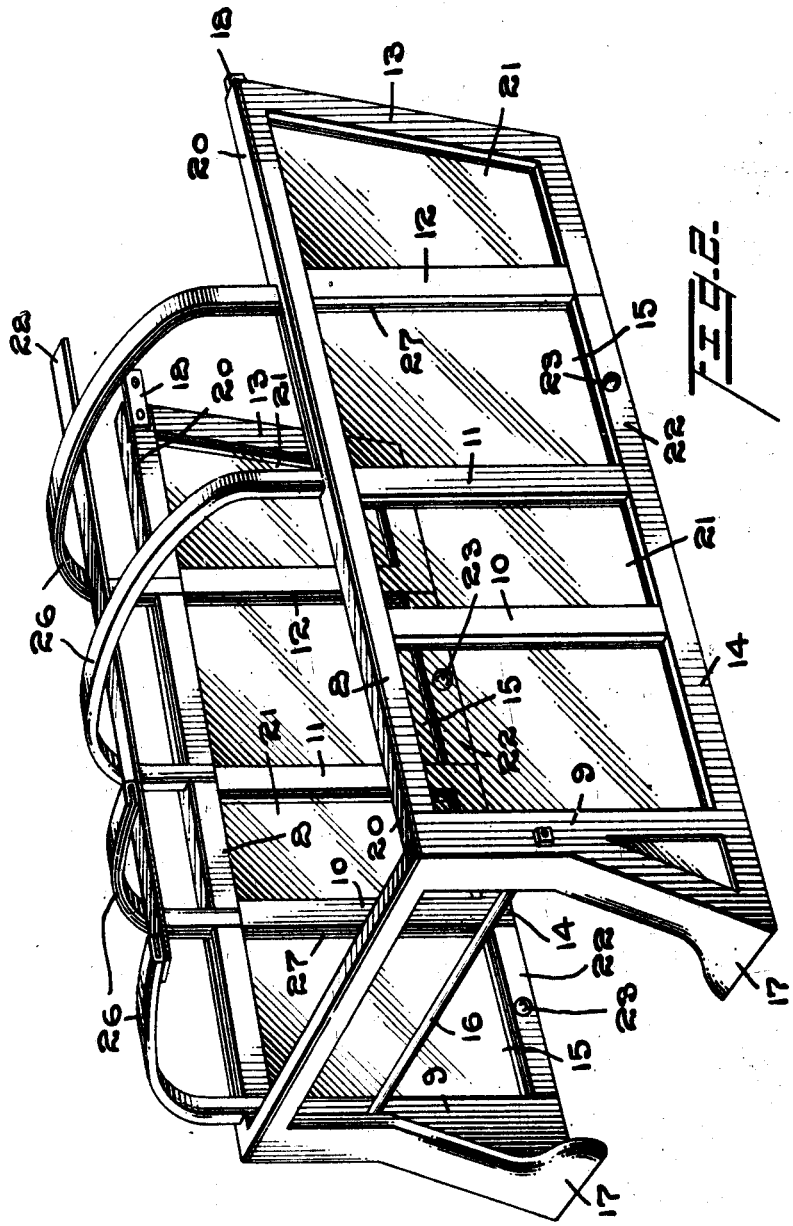
Witnesses
L. R. Moyer
C. R. Ziegler.
Inventor
Edwin F. Whartenby,
By Joshua R. H. Potts.
His Attorney

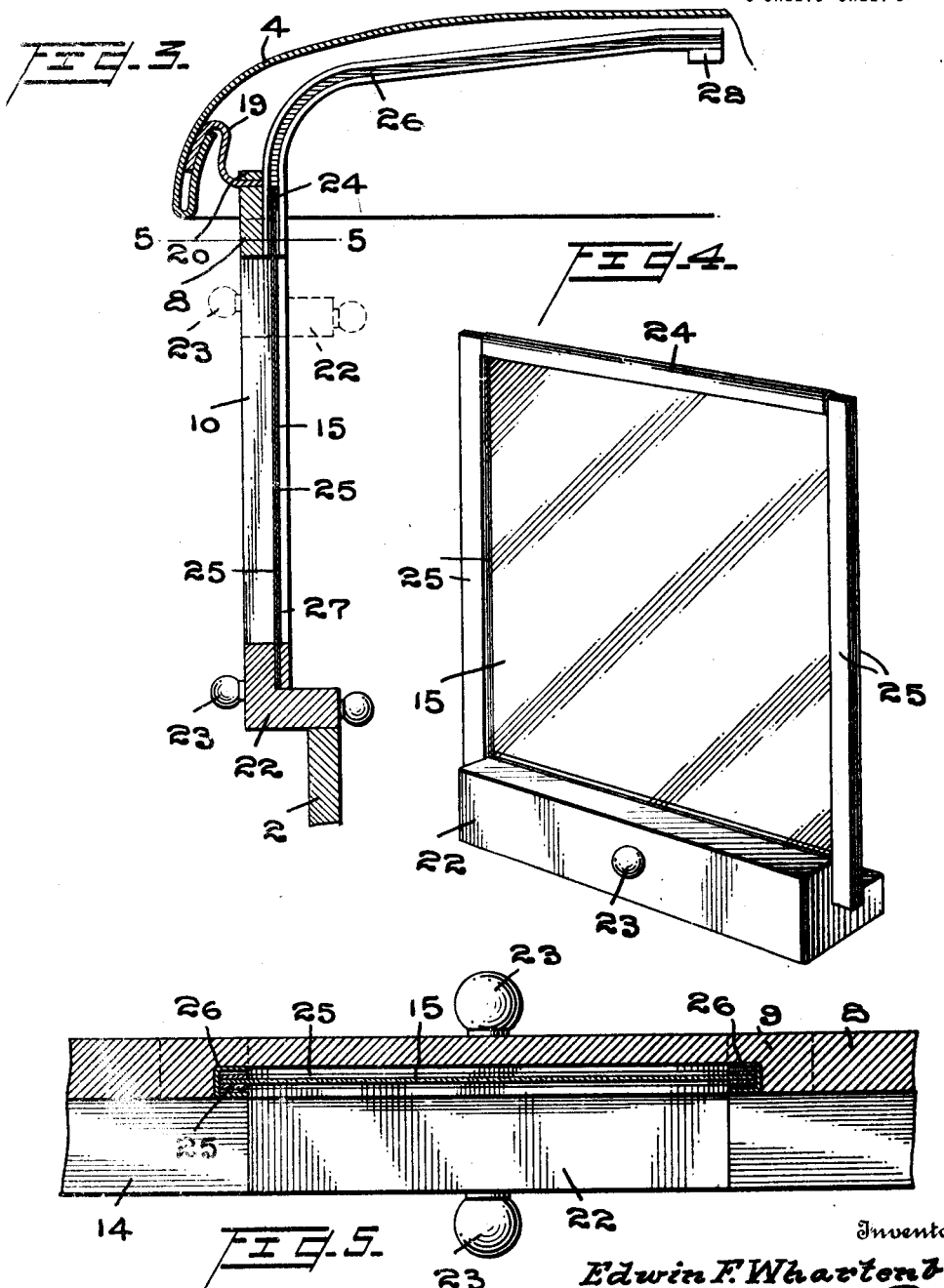

UNITED STATES PATENT OFFICE.

EDWIN F. WHARTENBY, OF PHILADELPHIA, PENNSYLVANIA.

VEHICLE BODY-INCLOSURE.

1,163,727. Specification of Letters Patent. Patented Dec. 14, 1915.

Application filed January 23, 1915. Serial No. 3,865.

*To all whom it may concern:*

Be it known that I, EDWIN F. WHARTENBY, a citizen of the United States, residing at Philadelphia, in the county of Philadelphia and State of Pennsylvania, have invented certain new and useful Improvements in Vehicle Body-Inclosures, of which the following is a specification.

My invention relates to improvements in vehicle body inclosures, the object of the invention being to provide an inclosure which is designed particularly for use on automobiles of the touring car type, serving to transform the car into a limousine.

A further object is to provide an inclosure of the character stated which can be manufactured and sold at an extremely low price, which can be placed on the car by any one of average intelligence, not requiring skilled labor, and which will most effectually exclude the weather and protect the occupants of the car.

A further object is to provide an inclosure of the character stated which is adapted to be removed and replaced at will, and which is made with a vertically sliding flexible sash or sashes of transparent material which move in guides in the top of the vehicle body, and which may be raised to any desired height or entirely closed to suit the occupants of the vehicle.

A further object is to provide an inclosure of the character stated in which vertically movable transparent flexible sashes are provided and positioned above the doors of the vehicle body, said sashes resting directly upon the doors, and when moved upwardly, offer no obstruction to the entrance to or exit from the vehicle body when the doors are open.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved inclosure in position on an automobile body. Fig. 2 is a perspective view of my improved inclosure detached. Fig. 3 is a fragmentary view in vertical section on an enlarged scale on the line 3—3 of Fig. 1. Fig. 4 is a perspective view of one of the vertically sliding sashes, and Fig. 5 is a view in transverse section on the line 5—5 of Fig. 3.

1 represents the body of an ordinary automobile having front and rear doors 2 and 3 respectively, and provided with a top 4 supported by uprights 5 and braces 6 as is customary with the vehicles of the touring car type.

To inclose the body with my improved inclosure, I utilize the ordinary rear curtain 7 and wind shield (not shown) with which cars of this type are ordinarily equipped, and I would have it understood that while I have illustrated a particular form of vehicle body, that my invention is not limited in this particular, as I may construct the inclosure to fit any ordinary type of body.

My improved inclosure which is shown in perspective in Fig. 2 comprises a frame which may be of wood or metal, but I preferably employ wood, because of its weight. This frame consists of parallel upper bars 8 connected at both sides by uprights 9, 10, 11, 12, and 13, with lower horizontal bars 14. These lower bars 14 are relatively short. That is to say, they do not extend throughout the entire length of the bottom of the frame, as I provide between certain of the uprights vertically sliding sashes 15, and the frame is open at its lower portion where it is provided with the sashes, so that the sashes will rest directly upon the doors 2 and 3 of the body and offer no obstruction to the entrance when the sashes are raised.

With most types of vehicle, it is desirable to have sashes 15 above both rear doors 3, and a single sash 15 above one of the front doors 2, as it is customary to enter the front of the vehicle from one side only in accordance with the location of the steering wheel. The sides of the frame, at the front, are connected by a transverse rod 16 which serves to tightly clamp the parts and hold them against movement. This rod may also constitute a pivot for the wind shield, and the forward end of the frame is off-set or projected forwardly at its lower portion as shown at 17 to properly position the wind shield. This particular shape is, of course, immaterial, as it can be changed to suit any form of construction at the front end of the car.

Metal straps 18 are provided at the rear and upper portion of the frame which serve to connect the same to the vehicle top 4, and a flexible curtain 19 is secured to the upper edge of the frame throughout its length by means of strips 20. This curtain is secured to the vehicle top in any approved manner, one manner of removably connecting the curtain is to project the same into the inturned edge of the cover 4 as shown in Fig. 3, to prevent any entrance of air between the frame and the vehicle top.

My improved flexible sliding sashes 15 are composed of mica or other similar flexible transparent material, and to all intents and purposes resemble the panes of glass 21 which are located between the uprights 9, 10, 11, 12, and 13 except when the sashes 15 are provided as above explained. Each sash 15 is provided at its lower end with a bar 22 of the same width as the lower bars 14 so that the contour of the lower portion of the frame is not marred. This lower bar 22 is secured rigidly to the sash 15, and is provided with knobs 23 to permit the same to be readily raised and lowered. The upper portion of each sash is provided with a metal clamping strip 24 of general U-shape, which is clamped upon the sheet of mica, and at all of the edges of the mica sheet, I provide reinforcing strips 25 which not only withstand the wear, but strengthen the sash. The edges of the sash move in guides 26 which curve in conformity with the top 4. These guides 26 are of general U-shape in cross section, and at their ends register with grooves 27 in the uprights 9, 10, 11, and 12, wherever sashes are provided, so that the edges of the sash have a free sliding movement and are held against lateral displacement to form a tight inclosure. Where a single sash is provided at the front of the vehicle, the guides 26 need extend only half way across the top, but where sashes are provided at both sides of the vehicle, the guides 26 will extend entirely across the top. These guides are held against displacement by means of a longitudinal strip 28, which is secured to all of the guide bars as clearly shown in Fig. 2.

By reason of the plurality of thicknesses of the sashes at the edges thereof, a sufficient frictional engagement is insured to not only exclude the weather, but also to hold the sash at any adjustment. This is particularly true because the sash when raised is caused to assume a curve as it moves through the guides 26 in the top of the vehicle. This holds the sash at any position of vertical adjustment, and allows the occupants of the vehicle to raise the sash as high as they desire and admit as much air as they please. Furthermore, it will be noted that when the sash is closed, the lower bar 22 thereof rests directly upon the top of the door. There is, therefore, no bar interposed between the sash and the door, and when the sash is raised and the door opened, there will be no obstruction to the free entrance or exit.

It will be noted that my improved inclosure will be designed and ornamented to suit the vehicle body on which it is used, and while I have illustrated but a plain simple design, it is to be understood that I may carry out any desired ornamentation to suit the trade.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination of a vehicle body having doors, a flexible top, and braces connecting the body and the top, an inclosure located between the body and the top, said inclosure relatively rigid comprising a frame having openings above certain of the doors and having vertically sliding flexible sashes located above said doors and at their lower edges supported directly upon the doors, substantially as described.

2. The combination of a vehicle body having doors, a flexible top, and braces connecting the body and the top, an inclosure located between the body and the top, said inclosure relatively rigid comprising a frame having openings above certain of the doors and having vertically sliding flexible sashes located above said doors and at their lower edges supported directly upon the doors, said frame having curved guides at its upper edge in which the flexible sashes are movable, substantially as described.

3. The combination of a vehicle body having doors, a flexible top, and braces connecting the body and the top, an inclosure located between the body and the top, said inclosure relatively rigid and having vertically sliding flexible sashes located above certain of the doors and at their lower edges supported directly upon the doors, said frame having curved guides at its upper edge in which the flexible sashes are movable, a longitudinal strip connecting all of the guides, and flexible material secured to the upper edge of the frame and removably connected to the inner face of the top, substantially as described.

In testimony whereof I have signed my name to this specification in the presence of two subscribing witnesses.

EDWIN F. WHARTENBY.

Witnesses:
 SIDNEY MARR,
 CHAS. E. POTTS.